(12) United States Patent
Smith et al.

(10) Patent No.: US 11,941,742 B2
(45) Date of Patent: Mar. 26, 2024

(54) TILED PROCESSOR COMMUNICATION FABRIC

(71) Applicant: Apple Inc., Cupertino, CA (US)

(72) Inventors: Adam J. Smith, St Albans (GB); Sergio V. Tota, London (GB); Christopher G. Martin, Cupertino, CA (US); Yoong Chert Foo, Greater London (GB); Terence M. Potter, Austin, TX (US); Max J. Batley, London (GB)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 17/808,392

(22) Filed: Jun. 23, 2022

(65) Prior Publication Data

US 2023/0419585 A1    Dec. 28, 2023

(51) Int. Cl.
  *G06T 15/00*    (2011.01)
  *G06F 9/38*    (2018.01)

(52) U.S. Cl.
  CPC .......... *G06T 15/005* (2013.01); *G06F 9/3887* (2013.01)

(58) Field of Classification Search
  None
  See application file for complete search history.

(56) References Cited

U.S. PATENT DOCUMENTS

| | | |
|---|---|---|
| 9,905,046 B2 | 2/2018 | Janczak et al. |
| 10,579,388 B2 | 3/2020 | Hartog et al. |
| 10,580,109 B2 | 3/2020 | Koker et al. |
| 11,036,660 B2 | 6/2021 | Ooi et al. |
| 11,157,431 B2 | 10/2021 | White et al. |
| 2019/0227963 A1* | 7/2019 | Ooi ........................ H01L 25/18 |
| 2019/0303334 A1* | 10/2019 | White ................. G06F 13/4027 |
| 2020/0044985 A1* | 2/2020 | Wang .................... H04L 47/527 |
| 2020/0387444 A1 | 12/2020 | Ramesh et al. |
| 2021/0056028 A1 | 2/2021 | Ray et al. |
| 2022/0100247 A1* | 3/2022 | Garg ..................... G06F 1/3203 |

FOREIGN PATENT DOCUMENTS

WO    2020/190797 A1    9/2020

OTHER PUBLICATIONS

International Search Report and Written Opinion in PCT Appl. No. PCT/US2023/021897 dated Sep. 1, 2023, 8 pages.

* cited by examiner

*Primary Examiner* — James A Thompson
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to processor communications fabrics. In some embodiments, a processor includes multiple client circuitry and fabric circuitry that includes at least first and second instances of a tile. The tile may include: client inputs configured to interface with client circuits, tile inputs configured to interface with one or more other tile instances, and communication resources assignable to the client inputs and tile inputs. The communications resources may include: multiple internal links, client outputs configured to interface with client circuits, and tile outputs configured to interface with one or more other tile instances. Control circuitry may, in a given cycle, assign communication resources of a given tile instance to at least a portion of the client inputs and tile inputs for a next cycle, based on priority information. The control circuitry may update priority information based on assignment results over multiple cycles.

20 Claims, 11 Drawing Sheets

|  | Input A, priority 5 | Input B, priority 7 | ... | Input N-1, priority 2 |
|---|---|---|---|---|
| Input A, priority 5 | x | 0 | | 1 |
| Input B, priority 7 | 1 | | | 1 |
| ⋮ | | | | |
| Input N-1, priority 2 | 0 | 0 | | x |

Example priority comparison matrix 700

FIG. 7

|  | Input A, priority 5 | Input B, priority 7 | ... | Input N-1, priority 2 |
|---|---|---|---|---|
| Input A, priority 5 | 1 | 0 | | 1 |
| Input B, priority 7 | 0 | | | 0 |
| ⋮ | | | | |
| Input N-1, priority 2 | 0 | 0 | | 1 |

Example priority mask matrix 800

In this example, the PMM is for a resource R that is requested by inputs A and N-1.

The sub-resource ID for input A and resource R is the sum of the top row.

A sum of 0 would mean input A did not request the resource. A sum of 1 means A is highest-priority input requesting the resource. A sum of N means A is lowest-priority input requesting the resource.

FIG. 8

Assign communication resources of tiled fabric circuitry for a given cycle based on priority information for a given tile instance's inputs, where the tile includes:
- client inputs configured to interface with client circuits
- tile inputs configured to interface with one or more other tile instances
- communication resources assignable to the client inputs and tile inputs, where the communication resources include:
  - multiple internal links
  - client outputs configured to interface with client circuits
  - tile outputs configured to interface with one or more other tile instances

1010

Update priority information for a given tile instance of the fabric circuitry based on assignment results over multiple cycles
1020

FIG. 10

TILED PROCESSOR COMMUNICATION FABRIC

BACKGROUND

Technical Field

This disclosure relates generally to processor architecture and more particularly to a tiled fabric for communications among processor circuitry.

Description of the Related Art

As complexity of computer processors increases, design of communications fabric between components may be important to meet performance, power consumption, and circuit area targets. For example, in the graphics processor context, the number of shader pipelines has generally increased over time and communications may occur between various agents (e.g., cache controllers, different types of execution pipelines, fixed function circuitry such as samplers, ray accelerator circuitry, etc.). Further, traditional designs may have difficulties scaling to meet the requirements of a given architecture.

BRIEF DESCRIPTION OF THE DRAWINGS

FIG. 7 is a diagram illustrating an example priority comparison matrix for arbitration, according to some embodiments.

FIG. 8 is a diagram illustrating an example priority mask matrix for arbitration, according to some embodiments.

FIG. 10 is a flow diagram illustrating an example method, according to some embodiments.

DETAILED DESCRIPTION

In disclosed embodiments, a tile-based fabric is configured to route communications between various processor agents. Examples of agents in the graphics context include a memory interface, one or more cache controllers, shader datapath circuitry, fixed-function circuitry, etc. In other contexts (e.g., central processing units or microcontrollers), similar fabrics may be implemented.

The disclosed tile-based fabric may have different configurations for different tiles, e.g., in terms of numbers of inputs and outputs in different directions and internal communication resources. Further, the fabric may be configured with different numbers of tiles in different designs. This may advantageously facilitate scaling of the fabric for different processor designs or configurations. In some embodiments, the fabric supports different virtual channels that may have different quality-of-service parameters (e.g., non-stallable channel(s) and stallable channel(s)).

Within a given tile, the fabric may support single-cycle arbitration among inputs, which may be achieved by performing various arbitration operations at least partially in parallel for different inputs. The fabric may also utilize a priority update scheme based on a multi-cycle window of arbitration results.

Figure 1A:
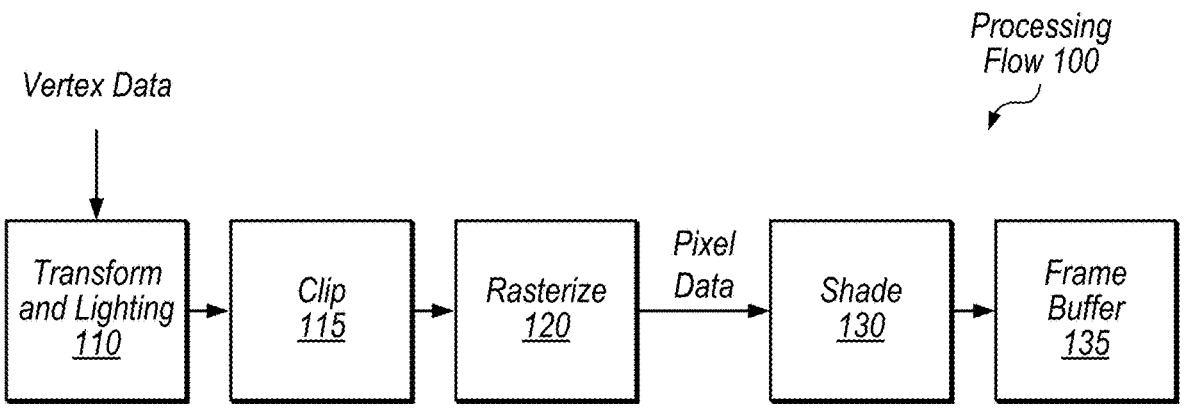
FIG. 1A is a diagram illustrating an overview of example graphics processing operations, according to some embodiments.
Figure 1B:
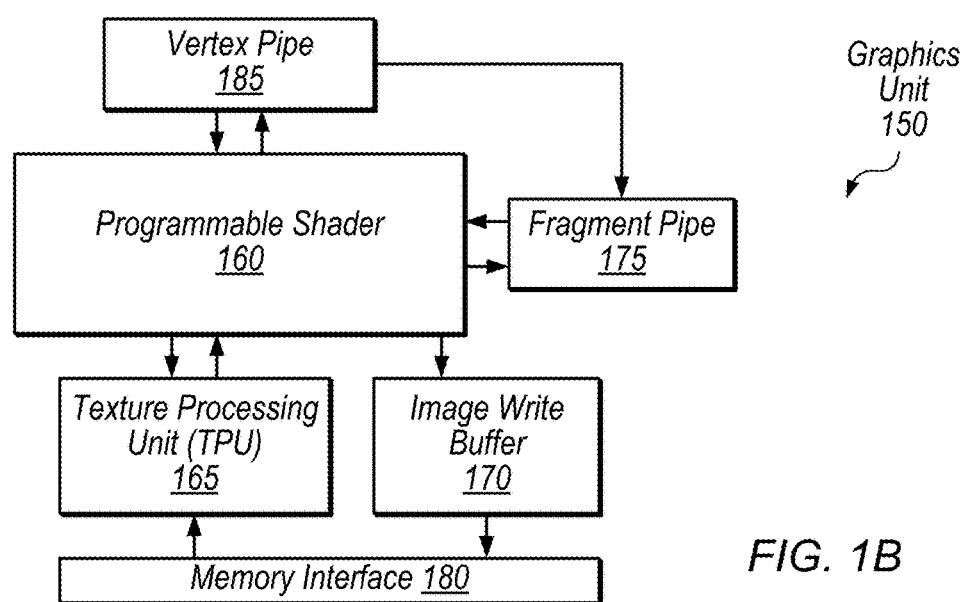
FIG. 1B is a block diagram illustrating an example graphics unit, according to some embodiments.

The following discussion of FIGS. 1A and 1B provides an overview of an example graphics processor, although disclosed circuitry may be used in various types of processors, e.g., central processing units, microcontrollers, machine learning accelerators, etc. The discussion of FIGS. 2-10 covers various tiled fabric circuitry and arbitration techniques, according to some embodiments.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Tiled Fabric and Example Tile Structure

Figure 2:
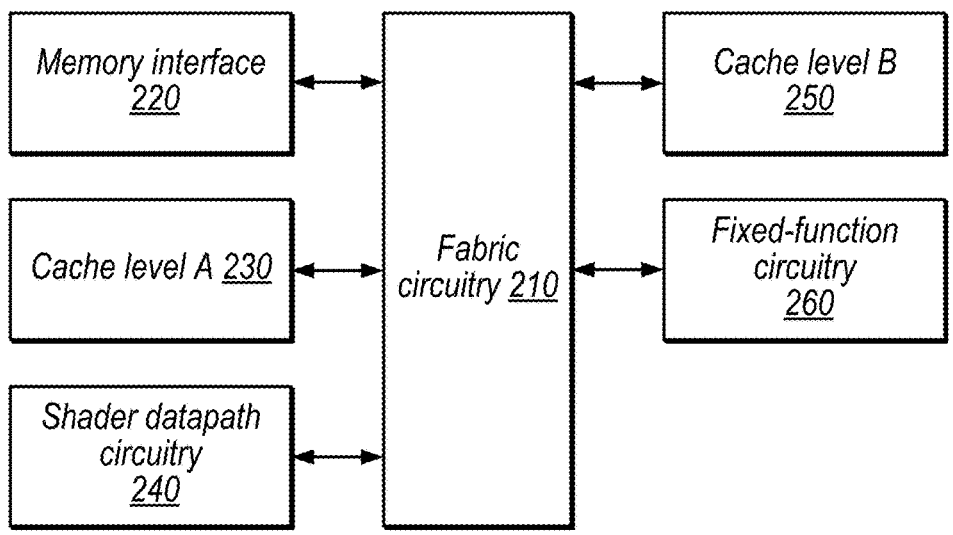
FIG. 2 is a block diagram illustrating example clients configured to communicate via a fabric, according to some embodiments.

FIG. 2 is a block diagram illustrating example fabric circuitry 210 that connects multiple clients, according to some embodiments. In the illustrated embodiment, the clients include memory interface 220, cache level A 230, cache level B 250, shader datapath circuitry 240, and fixed-function circuitry 260.

Memory interface 220 may provide access to a system memory. In some embodiments, interface 220 provides access to a unified memory subsystem that is shared and dynamically allocatable. Various clients may utilize memory space via interface 220. Caches may use memory interface 220 to store data in backing memory, e.g., for evictions or write-through operations. Registers and private memory spaces for various clients may be memory backed via memory interface 220.

Certain clients may also communicate directly with eachother, e.g., for non-memory accesses such as control packets. Generally, fabric circuitry 210 may support various appropriate packets via a packet-switched network. In packet-switched implementations, fabric circuitry 210 may route packets from source to destination based on header information and may be agnostic to packet payload contents.

Clients may include any of various cache levels (e.g., 230 and 250) which may be dedicated to instructions/data or may be shared for both. Various caches may be write-back or write-through implementations, for example. Shader datapath circuitry 240 may include SIMD execution pipelines configured to execute various programs, including compute programs, vertex programs, fragment programs, etc. Fixed-function circuitry may be configured to perform various operations, e.g., texture sampling operations, ray tracing operations, or certain vertex operations. In other embodiments, various clients are contemplated in addition to or in place of the illustrated clients.

In some embodiments, one or more clients may have access to other fabrics, e.g., a system-on-a-chip fabric that communicates with elements external to the processor that includes fabric circuitry 210. Thus, fabric circuitry 210 may be one or multiple fabrics of a given computing system and the different fabrics may have different configurations.

Example of communications via the fabric include: communications with a level 0 data cache, requests for vertex data from a level 1 cache, fetch requests and fragment feedback data, initializing SIMD group state in private memory, line fill requests from caches (including data caches, instruction caches, or both), etc. Speaking generally, some paths through the fabric may be considered more important than others and these paths may be designed to provide lower latency, different power consumption, etc. to those paths, potentially at the expense of other paths.

Figure 3:
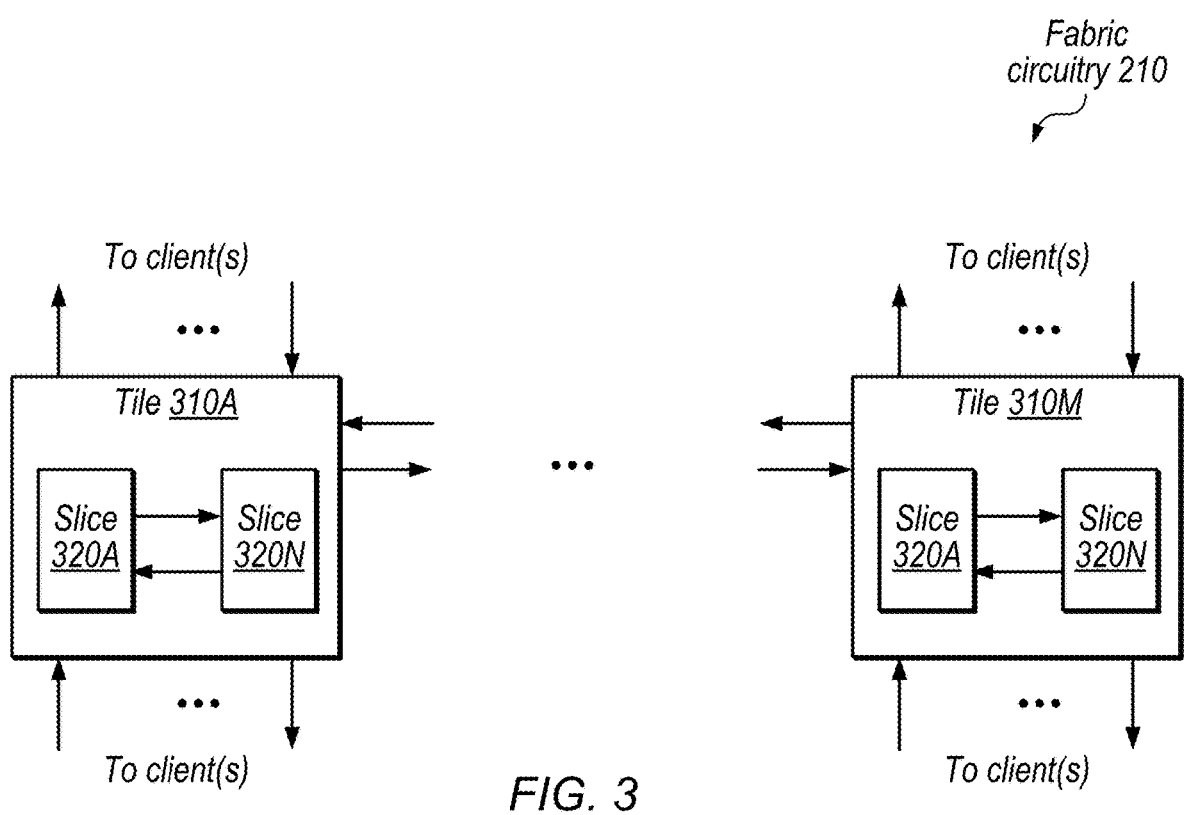
FIG. 3 is a block diagram illustrating example tile-based fabric circuitry, according to some embodiments.

FIG. 3 is a block diagram illustrating an example tiled fabric architecture, according to some embodiments. In the illustrated embodiment, fabric circuitry 210 includes tiles 310A-310M. In this example, each tile includes client inputs and outputs, inputs and outputs to other tiles, internal slices 320A-320N, and internal interfaces between slices. As briefly discussed above, different tiles may have different numbers of client inputs and outputs (also, different clients may have different numbers of inputs or outputs to the fabric). Different tiles in the fabric may also have different numbers or configurations of internal slices.

As shown, tiles may be arranged in a chain configuration, with a given tile communicating with its left and right neighbors (other than tiles on the end of the chain, which may have a single neighbor). In other embodiments, various tile connection topologies may be implemented, e.g., ring, star, etc. Thus, speaking generally, a given tile may receive inputs from one or more other tiles and send outputs to one or more other tiles.

In some embodiments, the fabric performs single-cycle arbitration among requests to a given tile based on current priority of inputs and may adjust priority over a multi-cycle window.

Example Tile Circuitry

Figure 4:
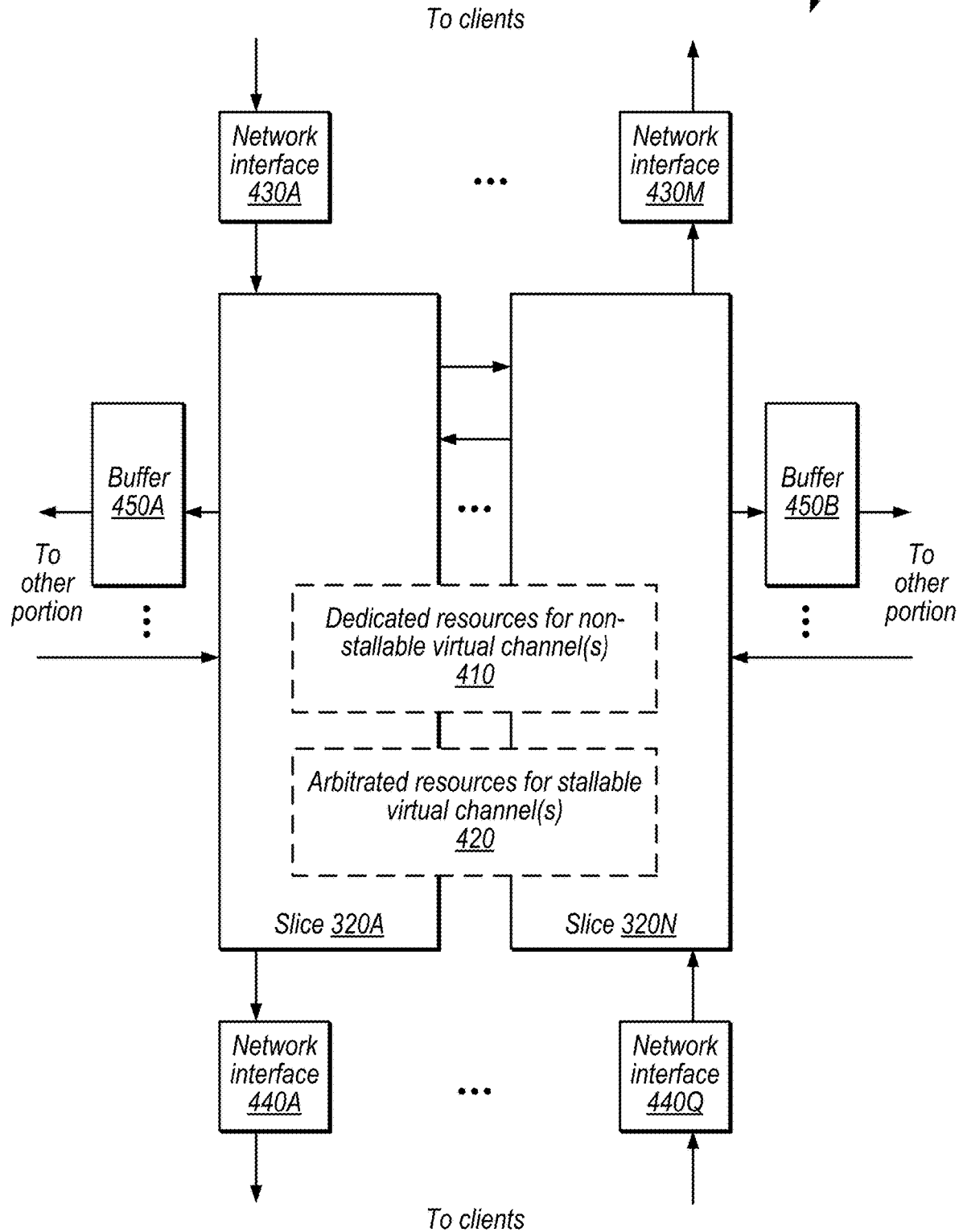
FIG. 4 is a block diagram illustrating a detailed example tile that includes multiple slices, according to some embodiments.

FIG. 4 is a block diagram illustrating a more detailed view of a given tile, according to some embodiments. In the illustrated embodiment, the tile includes slices 320A-320N, network interfaces (NI's) 430A-430M and 440A-440Q, and buffers 450A and 450B.

Speaking generally, a given tile 310 has a number of inputs and a number of resources that may be assigned to inputs. The resources may include outputs in various directions and links within a tile 310, for example.

Note that various embodiments herein are described using north/south/east/west or horizontal/vertical coordinates. These terms are used to describe an example topology but are not intended to limit the positioning of the various inputs and outputs. Further, topologies with other numbers of dimensions may be utilized, e.g., with 2, 3, 5, 6, etc.-sided tiles.

Figure 5:
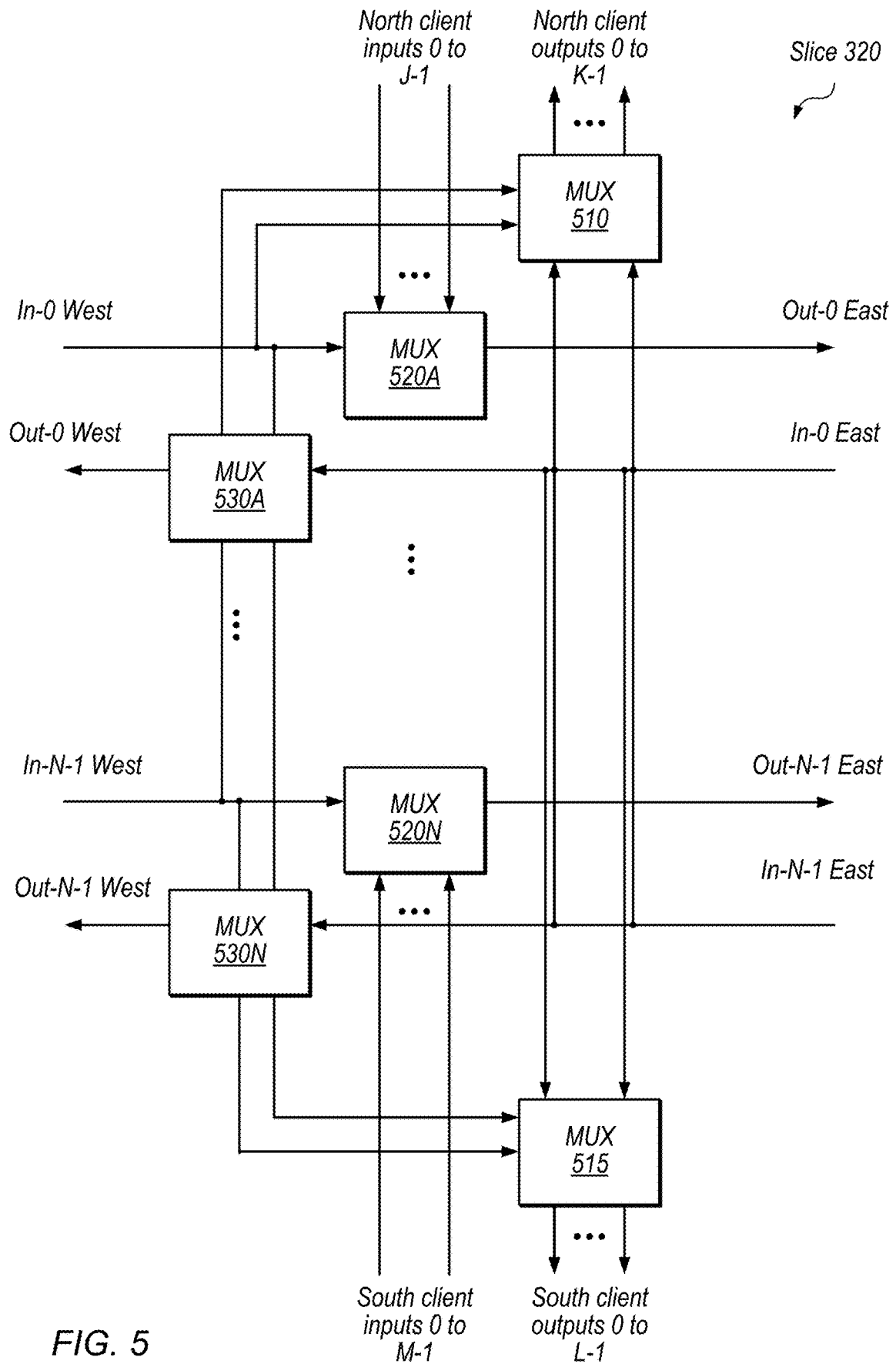
FIG. 5 is a block diagram illustrating a detailed example slice, according to some embodiments.

As indicated by the dashed lines, slices 320 may include dedicated resources for non-stallable virtual channel(s) and arbitrated resources for stallable virtual channel(s). In some embodiments, all resources are arbitrated, but the highest K priority values are dedicated to non-stallable channels and a given tile includes sufficient resources to always satisfy requests from the highest K priority values (even though specific resources may not be assigned to those channels and dedicated resources may not be physically separate from non-dedicated resources, in these embodiments). A detailed example slice is shown in FIG. 5, as discussed in detail below following the description of FIG. 4.

The network interfaces 430 and 440, in the illustrated embodiment, provide interfaces to both north and south clients. Different interfaces may have different configurations, e.g., to conform to different client parameters. Receive (Rx) and transmit (Tx) network interface may be configured similarly or differently.

Buffers 450, in the illustrated embodiment, store packet data that is output to other tiles in east and west directions. As shown, tile 310 also receives inputs from east and west directions (e.g., via buffers that store output packets from other tiles), in this embodiment.

As shown, slices may be arranged according to a chain topology within a tile, although other topologies are contemplated. In some embodiments, a tile may include crossbar circuitry (not shown) at each end of the chain to route communications between tiles (e.g., between tile input buffers/output buffers and adjacent slice circuitry).

In some embodiments, each input a tile is one of the following: a north Tx NI input for packets entering the network in this tile from the north, a south Tx NI input for packets entering the network in this tile from the south, an east input buffer for packets coming from the tile to the east of this tile, and a west input buffer for packets coming from the tile to the west of this tile.

In some embodiments, each input interface to a tile has a single-bit input valid signal that is set when there is a packet available on this interface and a single-bit output ready signal that is set by the tile when a packet has been allocated all required routes through the tile. In some embodiments, each input interface to a tile has input resource requirement flags that indicate the resource types required to route that packet from input to output(s) of the current tile.

As one example, resource types that may be required by an input packet may include, without limitation: a north Rx NI connected to the tile, a south Rx NI connected to the tile, east horizontal links that route through the tile, east outputs of the tile; west horizontal links that route through the tile, and west outputs of the tile.

Note that various restrictions may be placed on input resource requirements, in some embodiments. For example, in some embodiments, north inputs cannot require a north Rx NI within the same slice, south inputs cannot require a south Rx NI within the same slice, east inputs cannot require an east horizontal link or an east output, west inputs cannot require a west horizontal link or a west output, at least one north or south Rx NI or east or west output must be required by each valid input, an east horizontal link is required if an input requires an east output, an east horizontal link is required if a Tx NI input requires an Rx NI in a slice to the east of the input, an east horizontal link is required if a west input requires an Rx NI in any slice but the most westerly one, a west horizontal link is required if an input requires a west output, a west horizontal link is required if a Tx NI input requires an Rx NI in a slice to the west of the input, and a west horizontal link is required if an east input requires an Rx NI in any slice but the most easterly one. The specific restrictions are included for purposes of explanation (and to provide background for arbitration techniques discussed below), but are not intended to limit the scope of the present disclosure.

Example Slice Circuitry

FIG. 5 is a block diagram illustrating a detailed example slice, according to some embodiments. In the illustrated example, a slice includes multiplexers (MUX's) 510, 515, 520A-520N, and 530A-530N. As shown, slice 320 has J north client inputs, K north client outputs, M south client inputs, and L south client outputs. Similarly, slice 320 has N inputs and outputs in the east and west directions. Thus, each slice may have the following main parameters, in these embodiments: number N of east/west inputs/outputs, number J of north inputs, number K of north outputs, number M of south inputs, and number L of south outputs.

MUX 510, in the illustrated embodiment, receives all the east and west inputs and selects outputs to K north clients. Similarly, MUX 515, in the illustrated embodiment, receives all the east and west inputs and selects outputs to L north clients.

Each MUX 520 and 530, in the illustrated embodiment, receives one or more horizontal inputs and a number of north inputs, a number of south client inputs, or both. Each MUX 520 and 530 may be configurable in the amount of slice inputs which can access to any given horizontal output. In some situations, each horizontal MUX 520 or 530 may have at least as many inputs as the number of north and south inputs plus the horizontal link directly in front of it. However, to improve the efficiency of the horizontal link utilization, each horizontal mux may also accept inputs from the other horizontal links up to N. With a full set of inputs each slice becomes a full crossbar, but in other embodiments (or in some slices) only a subset of the horizontal inputs may be specified to connect to a specific MUX instance.

Control circuitry may control various illustrated multiplexers to select inputs that win arbitration to use tile resources in a given cycle, e.g., based on the arbitration techniques discussed in detail below.

Example Arbitration for Tile Resources

Figure 6:
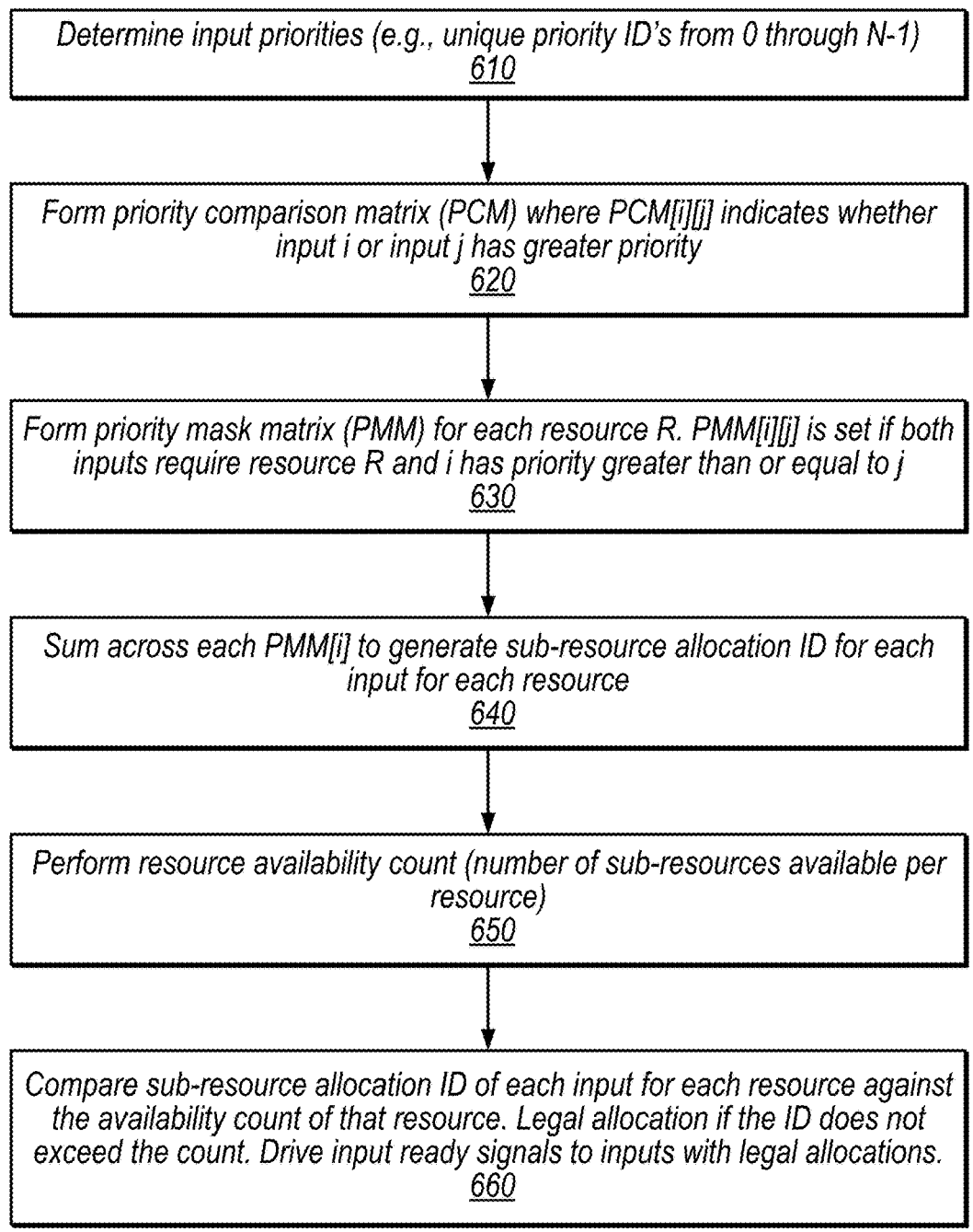
FIG. 6 is a flow diagram illustrating an example single-cycle arbitration technique for a tile, according to some embodiments.

FIG. 6 is a flow diagram illustrating an example arbitration technique 600, according to some embodiments. In some embodiments, control circuitry for each tile performs this arbitration technique each cycle to assign resources to inputs for the cycle. For example, the control circuitry may assert controls signals to the multiplexers of FIG. 5 based on this technique. As discussed below with reference to FIG. 9, a multi-cycle priority update procedure updates priorities for the next set of cycles, e.g., based on which inputs win arbitration over a window.

Note that FIGS. 7 and 8 show example matrices that may be utilized by technique 600, and therefore will be referenced briefly below in conjunction with the discussion of FIG. 6.

At 610, in the illustrated embodiment, the control circuitry determines input priorities (e.g., unique priority identifiers from 0 through N-1 for N inputs). As discussed above, a subset of highest-priority inputs may be reserved for one or more non-stallable channels.

At 620, in the illustrated embodiment, the control circuitry forms an N by N priority comparison matrix (PCM) where PCM[i][j] indicates whether input-i or input-j has greater priority (e.g., a bit may be set in an entry of the matrix if input-i's priority is greater than or equal to input-j's). E.g., foreach(i j): PCM[i][j]=i.priorityID>=j.priorityID. Note that the same PCM values may be used for multiple cycles, e.g., when priorities have not changed between cycles.

Referring briefly to FIG. 7, an example PCM 700 is shown where input A has priority 5, input B has priority 7, and input N-1 has priority 2. Note that only a portion of the PCM may actually be stored in circuitry, e.g., because the diagonal may be don't-care (x's) and the two other portions may be mirrored along the diagonal. In this example, PCM[1][0] is set because input B has higher priority than input A.

At 630, in the illustrated embodiment, control circuitry forms an N by N priority mask matrix (PMM) for each tile resource R. In this example, PMM[i][j] is set if both inputs request resource R and input-i has a priority greater than or equal to input-j. Specifically, foreach(r): r.PMM[i][j]=i.valid && i.requiresResource[r] && j.valid && j.requiresResource[r] && PCM[i][j]. Note that the control circuitry may determine which inputs target which resources based on packet header information that indicates a destination client circuit, for example.

Referring briefly to FIG. 8, an example PMM 800 is shown. In this example, the priorities are the same as for FIG. 7, and inputs A and N request the resource R (while input B does not). In this example, PMM[0][N-1] is set because both input A and input N-1 request the resource R and input A has a greater priority. Note that this data structure may be stored in compressed form similarly to PCM 700, as discussed above, e.g., because the diagonal values are known and the remaining portions may be mirrored.

At 640, in the illustrated embodiment, the control circuitry sums across each row of the PMM's to generate a sub-resource allocation ID for each input for each resource. E.g., foreach(i,j): i.allocationID+=r.PMM[i][j].

Referring again to FIG. 8, the sub-resource allocation ID for input A is the sum of input A's row (the top row). A sum of zero, in this embodiment, indicates that input A did not request the resource. A sum of 1 means A is the highest-priority input requesting the resource. A sum of N means A is the lowest-priority input requesting the resource (all the inputs have higher priority and have their bits in the row set).

At 650, in the illustrated embodiment, the control circuitry performs a resource availability count to determine the number of sub-resources available per resource. This may be based on buffer status, number of tile outputs of one or more types, etc.

At 660, in the illustrated embodiment, the control circuitry compares the sub-resource ID of each input for each resource against the availability count of that resource. E.g., in parallel, foreach(r,s): r.availabilityCount+=r.subResourceAvailable[s]. The control circuitry determines a legal allocation if the ID does not exceed the count, e.g., foreach (i,r): i.allocationLegal[r]=i.allocationID [r]<=r.availabilityCount. The control circuitry may select the input to provide data for a legal allocation or stall the input otherwise.

In this manner, assignments of inputs to resources may change each cycle, even for cycles with the same input priorities, e.g., because the inputs that actually request resources may vary in the different cycles. Further, as discussed above, various calculations (such as determining PMM's for each resource and determining resource availability count) may be performed in parallel to facilitate single-cycle arbitration (or more generally, arbitration using a small number of cycles).

Example Priority Update Procedure

Figure 9:
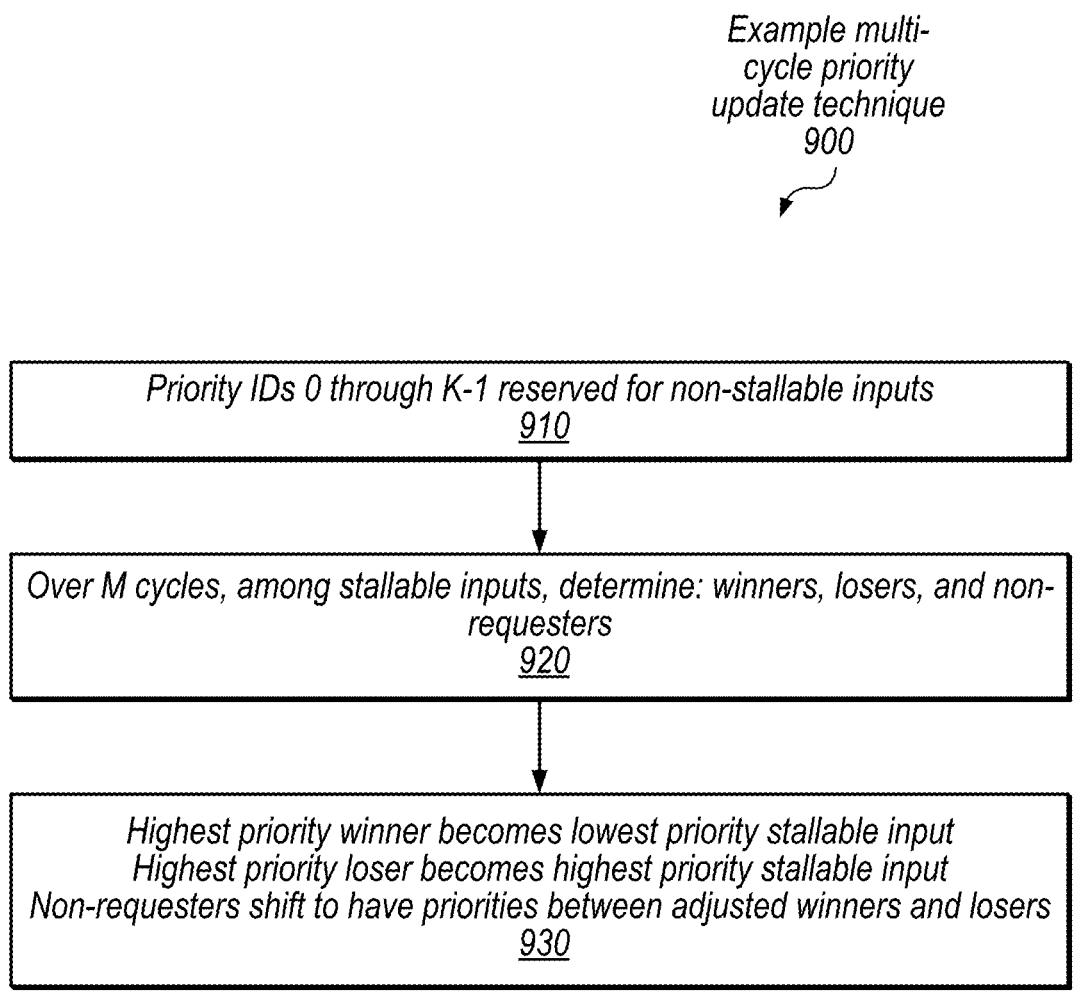
FIG. 9 is a flow diagram illustrating an example multi-cycle priority update technique, according to some embodiments.

FIG. 9 is a flow diagram illustrating an example priority update technique 900, according to some embodiments. In some embodiments, a priority update window is defined, e.g., as a certain number of cycles, and the control circuitry updates priorities of inputs for a given tile based on arbitration decisions during the window.

At 910, in the illustrated example, priority ID's 0 through K-1 are reserved for K non-stallable inputs. These priority IDs may be dynamically assigned each priority update procedure, or may be fixed. In other embodiments, a field may indicate whether an input is non-stallable and non-stallable inputs may be treated as having a higher priority than any stallable input.

At 920, in the illustrated example, control circuitry determines, over M cycles among stallable inputs: winners, losers, and non-requesters. For example, winners may be inputs whose request(s) were fully allocated requested resources. In some embodiments, winners may be separated into full winners (inputs whose most recent valid request was fully allocated requested resources) and partial winners (inputs that had a previous request that was fully allocated all requested resources within the decision window, but whose most recent valid request was not fully allocated all requested resources within the window). Losers may be inputs for which no valid requests were fully allocated requested resources within the decision window. Invalid/non-requesters may be inputs for which no valid requests were received within the decision window.

At 930, in the illustrated example, control circuitry adjusts priorities such that the highest priority winner becomes the lowest priority stallable input and the highest priority loser becomes the highest priority stallable input. Invalid inputs may have resulting priority values that are between losers and winners. In embodiments that track partial winners, the partial winners may have new priority values that are between the invalid inputs and the winners. Further, control circuitry may reverse the priority within a given class of inputs, e.g., reversing priority order for winner inputs and partial winner inputs.

Generally, disclosed techniques may advantageously provide fairness over time among stallable inputs. Further, in some embodiments, priority can only decrease for non-stallable inputs that have had at least one request granted within a window, so forward progress is advantageously guaranteed.

Example Method

FIG. 10 is a flow diagram illustrating an example method for using a tiled fabric, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, a computing system assigns communication resources of tiled fabric circuitry for a given cycle based on priority information for a given tile instance's inputs.

In some embodiments, the fabric includes at least first and second instances of a tile and the tile includes: client inputs configured to interface with client circuits of the computing system, tile inputs configured to interface with one or more other tile instances, and communication resources assignable to the client inputs and tile inputs. The communication resources may include: multiple internal links, client outputs configured to interface with client circuits, and tile outputs configured to interface with one or more other tile instances.

In some embodiments, the assignment assigns communications resources of a given tile instance to at least a portion of the client inputs and tile inputs for a next cycle based on the priority information for the tile instance's inputs.

In some embodiments, to assign communication resources of a given tile instance, control circuitry is configured to: determine priority information for the tile instance's inputs, at least partially in parallel for multiple communication resources and multiple inputs, determine a number of inputs having a higher priority than a given input and that request the same resource, determine, for a given resource, a number of inputs that the resource is able to service in the given cycle, and assign communication resources to inputs for the given cycle based on the determinations of the numbers of inputs.

In some embodiments, the communication resources include dedicated resources for one or more non-stallable virtual channels and arbitrated resources for stallable virtual channels. In some embodiments, the control circuitry is configured to assign a set of highest-priority indications to non-stallable virtual channel inputs.

At 1020, in the illustrated embodiment, the computing system updates priority information for a given tile instance of the fabric circuitry based on assignment results over multiple cycles.

In some embodiments, to update the priority information for a given tile instance based on assignment results over multiple cycles, the control circuitry categorizes inputs to the tile instance based on whether they received all or a portion of requested resources over the multiple cycles and updates priorities for inputs to the tile instance based on the categorization. For example, the categories may include: a winner category for inputs whose most recent valid request was fully allocated all requested resources, a partial winner category for inputs whose most recent valid request was not fully allocated all requested resources within the multiple cycles, for which a previous request was fully allocated all requested resources within the multiple cycles, a loser category for which no valid requests were fully allocated requested resources within the multiple cycles, and an invalid category for inputs for which no valid requests were received within the multiple cycles. In some embodiments, to update the priorities, the control circuitry prioritizes according to the following order from highest to lowest priority: loser inputs, invalid inputs, partial-winner inputs, then winner inputs. In some embodiments, the control circuitry may reverse priority ordering among the partial-winner inputs and reverse priority ordering among the winner inputs.

In some embodiments, a given tile instance includes multiple slices and the multiple internal links are links between slices. In some embodiments, the slices are arranged in a chain topology and a given tile instance includes a crossbar at one or both ends of the chain of slices (e.g., included as part of the end slices such that those slice's multiplexers have additional input for form a full crossbar). In some embodiments, the crossbar is connected to buffers configured to store data for the tile outputs and data from the tile inputs.

In some embodiments, the first and second instances of the tile include different numbers of inputs and different amounts of communication resources. In some embodiments the fabric circuitry includes a chain of tile instances that includes the first and second instances of the tile, wherein tile instances that are adjacent in the chain are connected via at least a portion of a given tile instance's tile inputs and tile outputs.

As used herein, the terms "clock" and "clock signal" refer to a periodic signal, e.g., as in a two-valued (binary) electrical signal. A clock periodically changes between "levels" of the clock such as voltage ranges of an electrical signal. For example, voltages greater than 0.7 volts may be used to represent one clock level and voltages lower than 0.3 volts may be used to represent another level in a binary configuration. As used herein, the term "clock edge" refers to a change in a clock signal from one level to another level. As used herein, the term "toggle" in the context of a clock signal refers to changing the value of the clock signal from one level to another level in a binary clock configuration. As used herein, the term clock "pulse" refers to an interval of a clock signal between consecutive edges of the clock signal (e.g., an interval between a rising edge and a falling edge or an interval between a falling edge and a rising edge). As used herein, the term "clock cycle" refers to an interval between edges of a clock (e.g., between rising edges or between falling edges in traditional embodiments or between adjacent edges in dual-edge embodiments).

Example Device

Figure 11:
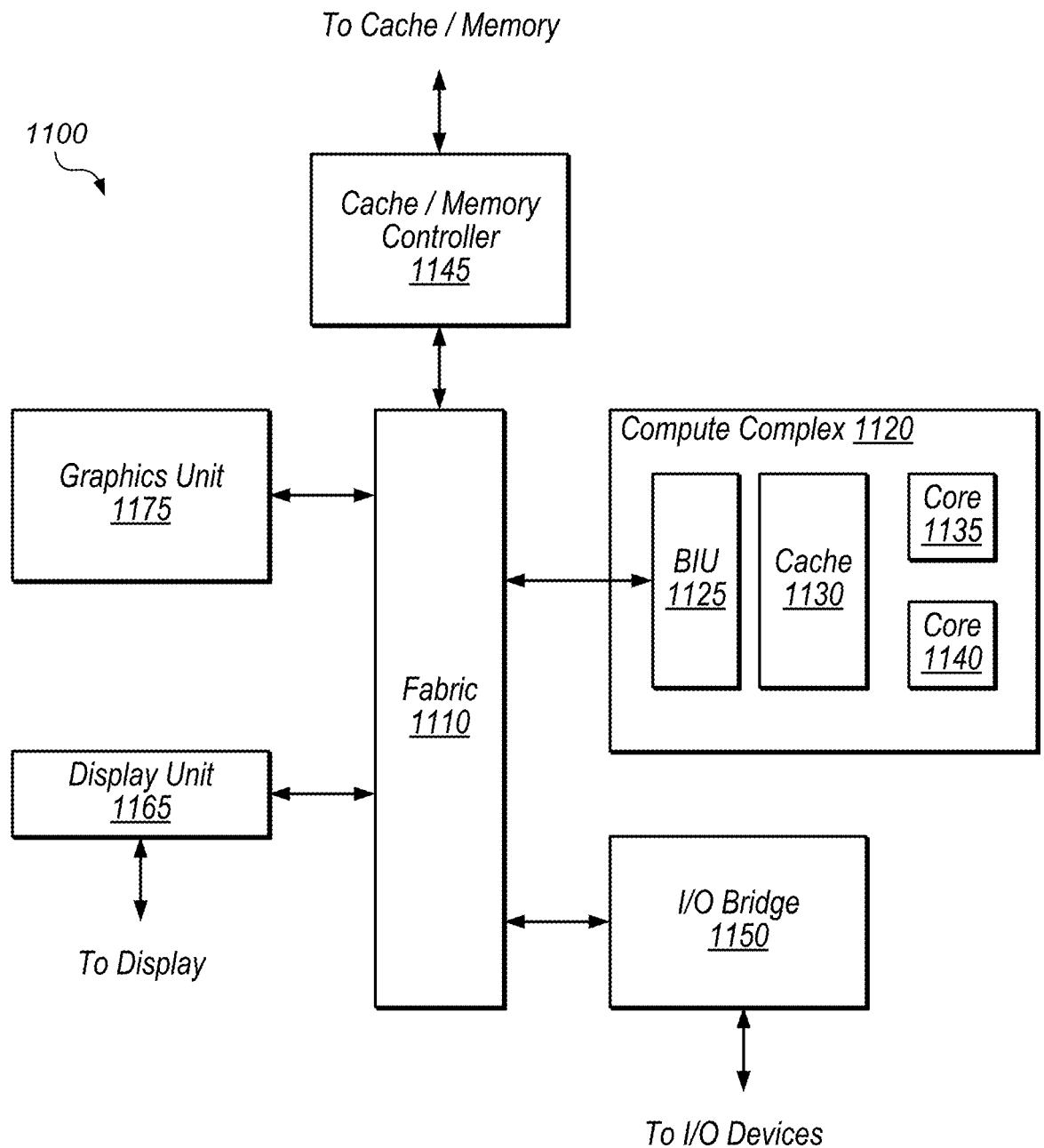
FIG. 11 is a block diagram illustrating an example computing device, according to some embodiments.

Referring now to FIG. 11, a block diagram illustrating an example embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120 input/output (I/O) bridge 1150, cache/memory controller 1145, graphics unit 1175, and display unit 1165. In some embodiments, device 1100 may include other components (not shown) in addition to or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally. Note that fabric 1110 may have a different topology and configuration than fabric circuitry 210.

In the illustrated embodiment, compute complex 1120 includes bus interface unit (BIU) 1125, cache 1130, and cores 1135 and 1140. In various embodiments, compute complex 1120 may include various numbers of processors, processor cores and caches. For example, compute complex 1120 may include 1, 2, or 4 processor cores, or any other suitable number. In one embodiment, cache 1130 is a set associative L2 cache. In some embodiments, cores 1135 and 1140 may include internal instruction and data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions.

Cache/memory controller 1145 may be configured to manage transfer of data between fabric 1110 and one or more caches and memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches.

As used herein, the term "coupled to" may indicate one or more connections between elements, and a coupling may include intervening elements. For example, in FIG. 11, graphics unit 1175 may be described as "coupled to" a memory through fabric 1110 and cache/memory controller 1145. In contrast, in the illustrated embodiment of FIG. 11, graphics unit 1175 is "directly coupled" to fabric 1110 because there are no intervening elements.

Graphics unit 1175 may include one or more processors, e.g., one or more graphics processing units (GPU's). Graphics unit 1175 may receive graphics-oriented instructions, such as OPENGL®, Metal, or DIRECT3D® instructions, for example. Graphics unit 1175 may execute specialized GPU instructions or perform other operations based on the received graphics-oriented instructions. Graphics unit 1175 may generally be configured to process large blocks of data in parallel and may build images in a frame buffer for output to a display, which may be included in the device or may be a separate device. Graphics unit 1175 may include transform, lighting, triangle, and rendering engines in one or more graphics processing pipelines. Graphics unit 1175 may output pixel information for display images. Graphics unit 1175, in various embodiments, may include programmable shader circuitry which may include highly parallel execution cores configured to execute graphics programs, which may include pixel tasks, vertex tasks, and compute tasks (which may or may not be graphics-related).

In some embodiments, the disclosed communication fabric may be included in graphics unit 1175 and may be used for communications between datapath circuitry, one or more cache levels, fixed function circuitry, etc. Disclosed techniques may advantageously facilitate communications in a scalable fashion. Note that the disclosed fabric may also or alternatively be implemented in other processors such as compute complex 1120.

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and low-power always-on functionality, for example. I/O bridge 1150 may also include interfaces such as pulse-width modulation (PWM), general-purpose input/output (GPIO), serial peripheral interface (SPI), and inter-integrated circuit (I2C), for example. Various types of peripherals and devices may be coupled to device 1100 via I/O bridge 1150.

In some embodiments, device 1100 includes network interface circuitry (not explicitly shown), which may be connected to fabric 1110 or I/O bridge 1150. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1100 with connectivity to various types of other devices and networks.

Example Applications

Figure 12:
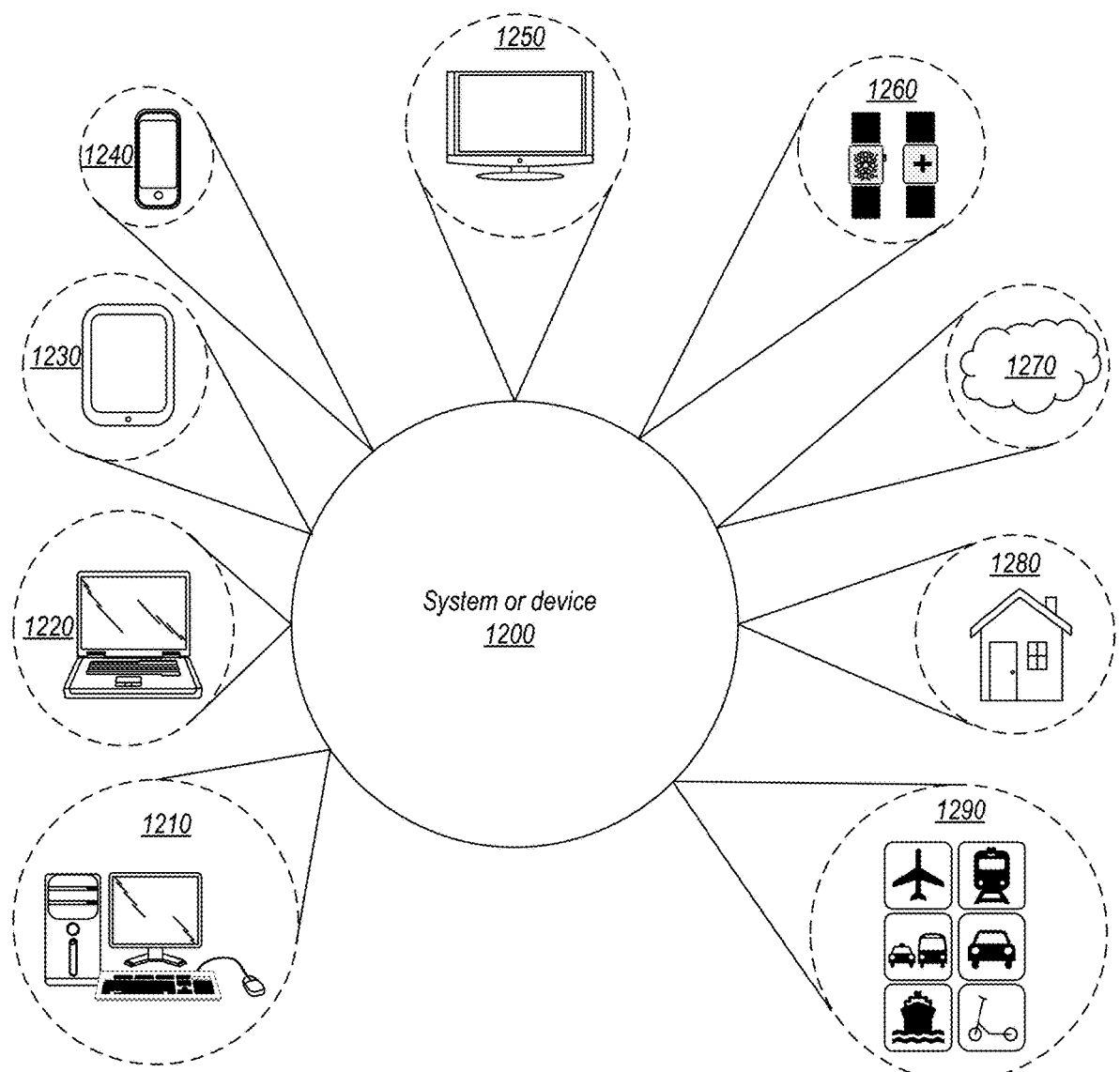
FIG. 12 is a diagram illustrating example applications of disclosed systems and devices, according to some embodiments.

Turning now to FIG. 12, various types of systems that may include any of the circuits, devices, or system discussed above. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 13:
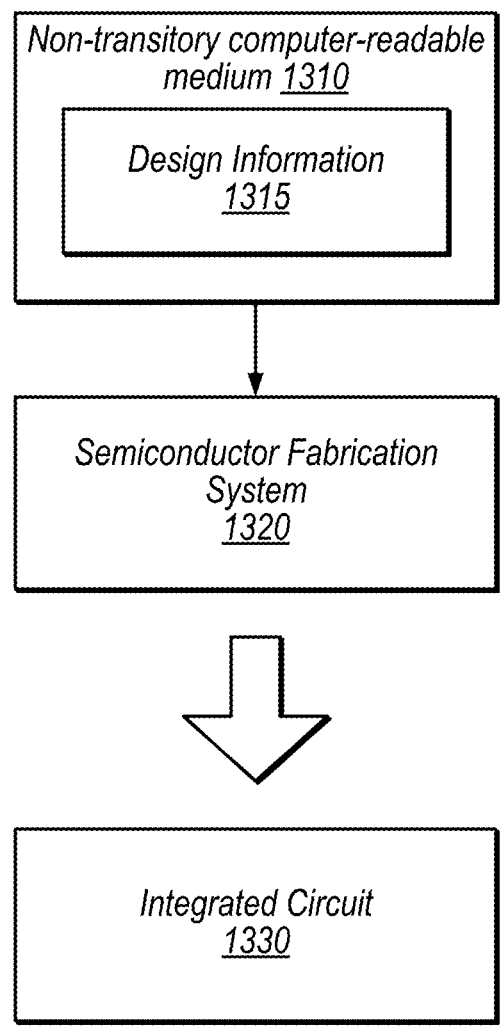
FIG. 13 is a block diagram illustrating an example computer-readable medium that stores circuit design information, according to some embodiments.

FIG. 13 is a block diagram illustrating an example non-transitory computer-readable storage medium that stores circuit design information, according to some embodiments. In the illustrated embodiment semiconductor fabrication system 1320 is configured to process the design information 1315 stored on non-transitory computer-readable medium 1310 and fabricate integrated circuit 1330 based on the design information 1315.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Non-transitory computer-readable storage medium 1310 may include two or more memory mediums which may reside in different locations, e.g., in different computer systems that are connected over a network.

Design information 1315 may be specified using any of various appropriate computer languages, including hardware description languages such as, without limitation: VHDL, Verilog, SystemC, SystemVerilog, RHDL, M, MyHDL, etc. Design information 1315 may be usable by semiconductor fabrication system 1320 to fabricate at least a portion of integrated circuit 1330. The format of design information 1315 may be recognized by at least one semiconductor fabrication system 1320. In some embodiments, design information 1315 may also include one or more cell libraries which specify the synthesis, layout, or both of integrated circuit 1330. In some embodiments, the design information is specified in whole or in part in the form of a netlist that specifies cell library elements and their connectivity. Design information 1315, taken alone, may or may not include sufficient information for fabrication of a corresponding integrated circuit. For example, design information 1315 may specify the circuit elements to be fabricated but not their physical layout. In this case, design information 1315 may need to be combined with layout information to actually fabricate the specified circuitry.

Integrated circuit 1330 may, in various embodiments, include one or more custom macrocells, such as memories, analog or mixed-signal circuits, and the like. In such cases, design information 1315 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 is configured to operate according to a circuit design specified by design information 1315, which may include performing any of the functionality described herein. For example, integrated circuit 1330 may include any of various elements shown in FIGS. 1B, 2-5, and 11. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

\*\*\*

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

\*\*\*

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

\*\*\*

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising a processor that includes:
   multiple client circuits;
   fabric circuitry that includes at least first and second instances of a tile, wherein the tile includes:
      client inputs configured to interface with client circuits;
      tile inputs configured to interface with one or more other tile instances; and
      communication resources assignable to the client inputs and tile inputs, wherein the communication resources include:
         multiple internal links;
         client outputs configured to interface with client circuits; and
         tile outputs configured to interface with one or more other tile instances;
   control circuitry configured to:
      in a given cycle, assign communication resources of a given tile instance to at least a portion of the client inputs and tile inputs for a next cycle based on priority information for the tile instance's inputs; and
      update priority information for a given tile instance of the fabric circuitry based on assignment results over multiple cycles.

2. The apparatus of claim 1, wherein to assign communication resources of a given tile instance, the control circuitry is configured to:
   determine priority information for the tile instance's inputs;
   at least partially in parallel for multiple communication resources and multiple inputs, determine a number of inputs having a higher priority than a given input and that request the same resource;
   determine, for a given resource, a number of inputs that the resource is able to service in the given cycle; and
   assign communication resources to inputs for the given cycle based on the determinations of the numbers of inputs.

3. The apparatus of claim 1, wherein the communication resources include:

dedicated resources for one or more non-stallable virtual channels; and arbitrated resources for stallable virtual channels.

4. The apparatus of claim 3, wherein the control circuitry is configured to assign a set of highest-priority indications to non-stallable virtual channel inputs.

5. The apparatus of claim 1, wherein to update the priority information for a given tile instance based on assignment results over multiple cycles, the control circuitry is configured to:

categorize inputs to the tile instance based on whether they received all or a portion of requested resources over the multiple cycles; and update priorities for inputs to the tile instance based on the categorization.

6. The apparatus of claim 5, wherein the categories of inputs include:

a winner category for inputs whose most recent valid request was fully allocated all requested resources;

a partial winner category for inputs whose most recent valid request was not fully allocated all requested resources within the multiple cycles, for which a previous request was fully allocated all requested resources within the multiple cycles;

a loser category for which no valid requests were fully allocated requested resources within the multiple cycles; and an invalid category for inputs for which no valid requests were received within the multiple cycles.

7. The apparatus of claim 6, wherein to update the priorities, the control circuitry is configured to prioritize according to the following order from highest to lowest priority:

loser inputs;
invalid inputs;
partial-winner inputs; then
winner inputs.

8. The apparatus of claim 7, wherein to update the priorities, the control circuitry is further configured to reverse priority ordering among the partial-winner inputs and reverse priority ordering among the winner inputs.

9. The apparatus of claim 1, wherein the first tile instance includes multiple slices and the multiple internal links are links between slices.

10. The apparatus of claim 9, wherein the slices are arranged in a chain topology and wherein the first tile instance includes a crossbar at one or both ends of the chain of slices, wherein the crossbar is connected to buffers configured to store:

data for the tile outputs; and
data from the tile inputs.

11. The apparatus of claim 1, wherein the first and second instances of the tile include different numbers of inputs and different amounts of communication resources.

12. The apparatus of claim 1, wherein the fabric circuitry includes:

a chain of tile instances that includes the first and second instances of the tile, wherein tile instances that are adjacent in the chain are connected via at least a portion of a given tile instance's tile inputs and tile outputs.

13. The apparatus of claim 1, wherein the apparatus is a computing device that further includes:

a display; and
network interface circuitry.

14. The apparatus of claim 1, wherein the processor includes:

a plurality of single-instruction multiple-data pipelines configured to execute instructions; and fixed-function circuitry configured to control the single-instruction multiple-data pipelines perform operations for at least one of the following types of programs:

graphics shader programs; and
machine learning programs.

15. A method, comprising:

a computing system assigning communication resources of tiled fabric circuitry for a given cycle, wherein the fabric includes at least first and second instances of a tile, wherein the tile includes:

client inputs configured to interface with client circuits of the computing system;

tile inputs configured to interface with one or more other tile instances; and communication resources assignable to the client inputs and tile inputs, wherein the communication resources include:

multiple internal links;

client outputs configured to interface with client circuits; and tile outputs configured to interface with one or more other tile instances;

wherein the assigning includes assigning communications resources of a given tile instance to at least a portion of the client inputs and tile inputs for a next cycle based on priority information for the tile instance's inputs; and updating, by the computing system, priority information for a given tile instance of the fabric circuitry based on assignment results over multiple cycles.

16. The method of claim 15, wherein the assigning includes:

determining priority information for the tile instance's inputs;

at least partially in parallel for multiple communication resources and multiple inputs, determining a number of inputs having a higher priority than a given input and that request the same resource;

determining, for a given resource, a number of inputs that the resource is able to service in the given cycle; and assigning communication resources to inputs for the given cycle based on the determinations of the numbers of inputs.

17. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

multiple client circuits;

fabric circuitry that includes at least first and second instances of a tile, wherein the tile includes:

client inputs configured to interface with client circuits;

tile inputs configured to interface with one or more other tile instances; and communication resources assignable to the client inputs and tile inputs, wherein the communication resources include:

multiple internal links;

client outputs configured to interface with client circuits; and tile outputs configured to interface with one or more other tile instances;

control circuitry configured to:

in a given cycle, assign communication resources of a given tile instance to at least a portion of the client inputs and tile inputs for a next cycle based on priority information for the tile instance's inputs; and
update priority information for a given tile instance of the fabric circuitry based on assignment results over multiple cycles.

18. The non-transitory computer readable storage medium of claim 17, wherein to assign communication resources of a given tile instance, the control circuitry is configured to:
   determine priority information for the tile instance's inputs;
   at least partially in parallel for multiple communication resources and multiple inputs, determine a number of inputs having a higher priority than a given input and that request the same resource;
   determine, for a given resource, a number of inputs that the resource is able to service in the given cycle; and
   assign communication resources to inputs for the given cycle based on the determinations of the numbers of inputs.

19. The non-transitory computer readable storage medium of claim 17, wherein the communication resources include:
   dedicated resources for one or more non-stallable virtual channels; and
   arbitrated resources for stallable virtual channels.

20. The non-transitory computer readable storage medium of claim 17, wherein to update the priority information for a given tile instance based on assignment results over multiple cycles, the control circuitry is configured to:
   categorize inputs to the tile instance based on whether they received all or a portion of requested resources over the multiple cycles; and
   update priorities for inputs to the tile instance based on the categorization.

* * * * *